Patented Nov. 17, 1925.

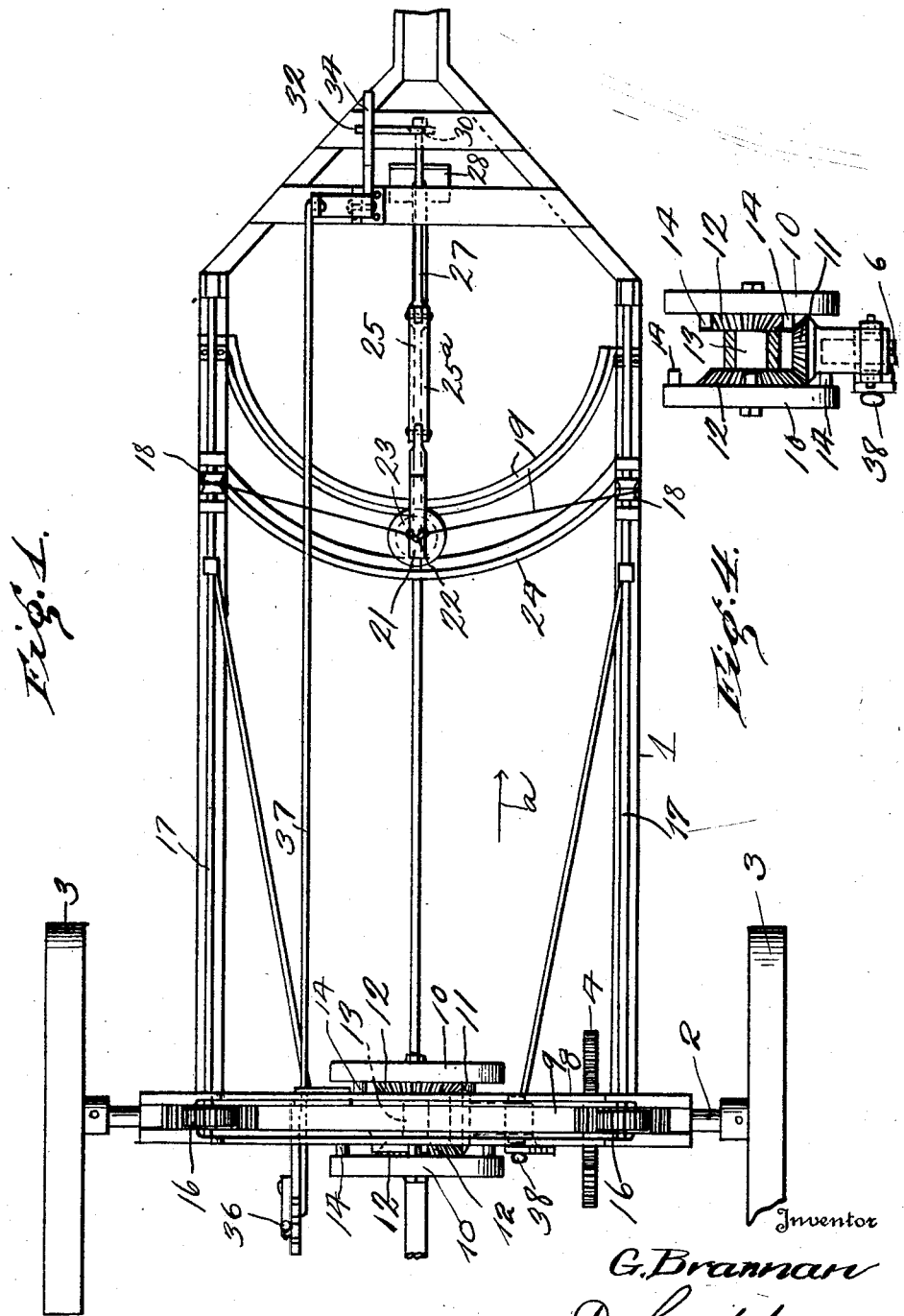

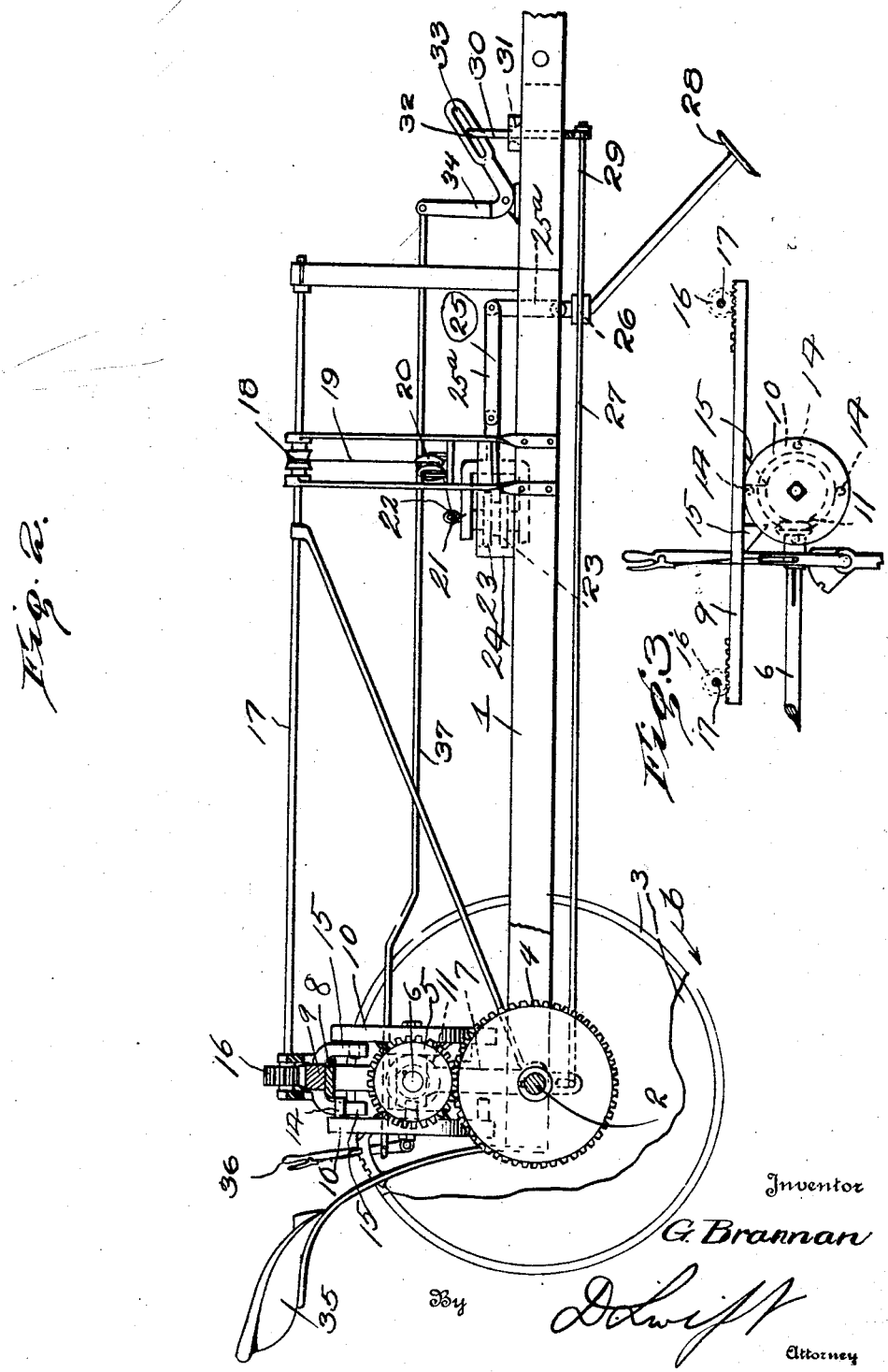

1,561,457

UNITED STATES PATENT OFFICE.

GUSS BRANNAN, OF INDIAN GAP, TEXAS.

POWER HOE.

Application filed December 4, 1924. Serial No. 753,864.

*To all whom it may concern:*

Be it known that I, GUSS BRANNAN, a citizen of the United States, residing at Indian Gap, in the county of Hamilton, State of Texas, have invented a new and useful Power Hoe; and I do hereby declare the following to be a full, clear, and exact description of the invention, such as will enable others skilled in the art to which it appertains to make and use the same.

The invention relates to power hoes and has for its object to provide a device of this character whereby a field may be easily and quickly hoed or worked by a hoe oscillated in a horizontal plane through operating connections with one of the ground engaging wheels of the power hoe.

A further object is to pivotally mount the hoe shaft so that it will swing in substantially a horizontal plane, and to provide the rear end of the shaft with a guide pulley mounted in an arcuately horizontally disposed guide and to provide shaft and cable means for imparting pulls on the hoe shaft in opposite directions thereby causing the hoe shaft to oscillate in a horizontal plane.

A further object is to provide adjacent the rear end of the machine a transversely disposed slidable rack bar, with which mesh gears carried by forwardly extending shafts having pulleys over which the cable extends, and to provide means whereby said slidable rack bar will be intermittently moved in opposite directions for imparting an oscillatory movement to the hoe shaft.

A further object is to provide the slidable rack bar with spaced arms extending downwardly between rotatable discs having inwardly extending lugs and gear means driven from the ground engaging wheel shaft for imparting rotation to the discs in opposite directions and intermittently moving the slidable bar in opposite directions by the engagement of the lugs of the discs with the downwardly extending members carried by the slidable bar.

With the above and other objects in view the invention resides in the combination and arrangement of parts as hereinafter set forth shown in the drawing, described and claimed, it being understood that changes in the precise embodiment of the invention may be made within the scope of what is claimed without departing from the spirit of the invention.

In the drawings:—

Figure 1 is a top plan view of the power hoe.

Figure 2 is a side elevation of the hoe.

Figure 3 is a detail sectional view taken on line 3—3 of Figure 1.

Figure 4 is a top plan view of the reversing mechanism.

Referring to the drawing, the numeral 1 designates a horizontally disposed frame, to which draft animals may be attached in any suitable manner. Extending transversely of the rear end of the frame 1 is a rotatable shaft 2 on the ends of which are secured ground engaging wheels 3. As the machine moves forwardly over the ground the wheels 3 are rotated in the direction of the arrow *b*, thereby rotating the shaft 3 in the same direction. Mounted on the shaft 2 and rotatable therewith is a gear 4, which gear meshes with a small gear 5, which is carried by an inwardly extending shaft 6, and which shaft is rotatably mounted in bearings of brackets 7 carried by the frame. Extending upwardly from the rear end of the frame and arching said rear end above the axle 2 is a U-shaped member 8 in which is slidably mounted a transversely disposed rack bar 9. Rack bar 9 is adapted to be reciprocated transversely during the rotation of the wheels 3, and to accomplish this result spaced rotatable discs 10 are provided, which discs are rotated in opposite directions by means of the bevelled gear 11, which meshes with the bevelled gears 12 carried by the discs 10, and which discs 10 are rotatably mounted on the shaft 13 below the bar 9. The inner sides of the discs 10 are provided with a plurality of lugs 14, which lugs, during the rotation of the discs in opposite directions cooperate with the downwardly extending arms 15, extending downwardly from the bar 9 for intermittently moving the rack bar 9 in one direction, and then in the other, the purpose of which will presently appear.

Meshing with the upper side of the rack bar 9, adjacent its opposite end are gears 16, which gears are carried by forwardly extending rotatable shafts 17, and it will be seen that as the bar 9 is reciprocated, the shafts 17 will be simultaneously rotated in the same direction thereby imparting rotation to the cable drums 18 carried by the shafts 17 adjacent their forward ends.

Extending around the pulleys 18, and preferably having several turns around the pulleys is a cable 19, which cable has its ends extending downwardly and under the pulleys 20 at the sides of the machine, and thence extend inwardly and are anchored to the guide roller yoke 21 at 22, therefore it will be seen that as the shafts are intermittently rotated simultaneously in opposite directions, the guide roller yoke 21 will be pulled to one side of the machine, and thence to the other side of the machine. Mounted in the guide roller yoke 21 is a flanged roller 23, which roller is guided in its arcuate movement by means of the spaced guide bars 24, therefore it will be seen that the hoe carrying bar 25, which is pivoted at 26 to a brace rod 27 will be thoroughly braced during the oscillation thereof on the pivotal point 26. The hoe bar 25 extends forwardly and downwardly through the bearing 26, thence inclines forwardly and downwardly and terminates in a hoe 28, which is rapidly oscillated transversely during the advancement of the machine, and by properly proportioning the gearing operating the bar 9 and the shafts 17, it will be seen that as many oscillations as desired may be obtained for the hoe, however they are preferably proportioned whereby upon one revolution of the ground engaging wheel eight oscillations will take place with the hoe, thereby thoroughly breaking up the ground. The hoe bar 25 is formed from a plurality of hingedly connected sections 25ª, which sections allow the forward end 29 of the bar 26 to be raised by the vertically disposed shaft 30 which is slidably mounted in a bearing 31 of the frame. The upper end of the vertically disposed shaft 30 is provided with a pin 32 which extends through an elongated slot 33 in a bell crank lever 34, and which bell crank lever is controlled from adjacent the operator's seat 35, through the medium of the hand lever 36 and connecting rod 37, therefore it will be seen that the forward end of the rod 27 may be raised or lowered as desired for raising or lowering the hoe 28, consequently any desired depth of cut may be taken by the hoe, and the hoe may be placed in inoperative position when not in use, for instance when the device is moving over the road from one field to another. By providing the hingedly connected sections 25ª, forming the hoe bar, with their hinging point horizontally disposed, it is obvious that during the oscillation of the hoe bar, the hoe 28 will be transversely arcuately moved, but the hinged connections allow movement of the bar 27 to various positions in a vertical plane without interfering with the oscillatory movement of the hoe bar. Also located adjacent the operator's seat 35 is a lever 38, which controls the bevelled gear 11, which is slidably keyed on the shaft 6, therefore it will be seen that when the operator so desires he may stop the operation or rotation of the disc 10, consequently the reciprocation of the rack bar 9 will be stopped when the hoeing operation is not desired.

From the above it will be seen that a hoeing machine is provided, which is simple in construction and provided with means whereby the operator located adjacent the rear end of the machine may easily control the oscillation of the hoeing element disposed adjacent the forward end of the machine, and the hoeing element is oscillated through the medium of gear and shaft connections to cable drums over which a cable extends for operating the hoe. Also the gear and shaft connections are driven from ground engaging wheels.

The invention having been set forth what is claimed as new and useful is:—

1. The combination with a hoeing machine comprising a pivoted oscillatory hoe bar carried by a frame, spaced rotatable shafts carried by the frame, endless cable connections between the shafts and the hoe bar whereby upon the rotation of the shafts in one direction and then the other, the hoe bar will be oscillated, a guide roller carried by the hoe bar and movable in an arcuate guide, a transversely movable rack bar, gear connections between the rack bar and the spaced shafts and means cooperating with the rack bar for imparting reciprocation to the rack bar as the machine moves over the ground.

2. A hoeing machine comprising a frame, ground engaging wheels carried by said frame, a shaft on which the wheels are secured, a transversely disposed slidable rack bar, a pivoted hoeing element carried by the frame, means operated by the wheel shaft for reciprocating the rack bar, driving connections between the rack bar and the hoeing bar whereby the hoeing bar will be oscillated during the reciprocation of the rack bar, and arcuate guiding means for guiding the hoeing element during its reciprocation.

3. A hoeing machine comprising a frame, a rotable shaft adjacent its rear end, ground engaging wheels secured to said shaft, a hoeing element pivotally mounted on a vertical axis. a rearwardly extending arm carried by said hoeing element, said rearwardly extending arm being formed from a plurality of hingedly connected sections allowing the hoeing element to be moved vertically, a horizontally disposed arcuate guide, a guide roller mounted in said guide, a rack bar, controllable driving connections between the shaft and the rack bar whereby said rack bar will be reciprocated, pinions meshing with said rack bar, forwardly extending shafts carried by said pinions, drums mounted on said shafts and endless cable connections between the drums and the rearwardly extending arm of the hoeing element.

4. The combination with a hoeing machine having a pivoted arcuately movable hoeing element, said hoeing element being pivotally mounted in a support carried by the machine, of a rearwardly extending arm carried by the hoeing element, said arm being movable in a horizontal plane and formed from a plurality of hingedly connected sections having vertical movement in relation to each other, guide means for guiding the rear end of said arm, of means whereby the supporting member may be raised or lowered.

In testimony whereof I have signed my name to this specification.

GUSS BRANNAN.